Figure 1:
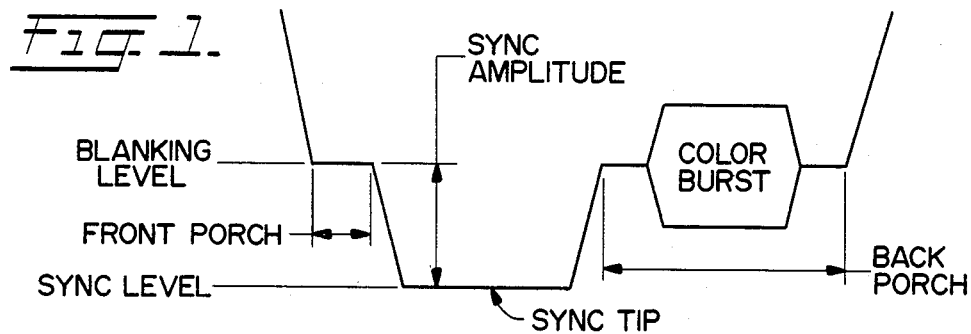

United States Patent [19]

Nakamura

[11] Patent Number: 4,516,042
[45] Date of Patent: May 7, 1985

[54] CLAMP CIRCUITS

[75] Inventor: Michael D. Nakamura, Portland, Oreg.

[73] Assignee: Tektronix, Inc., Beaverton, Oreg.

[21] Appl. No.: 393,966

[22] Filed: Jun. 30, 1982

[51] Int. Cl.³ .............................................. H03K 5/08
[52] U.S. Cl. .................................... 307/546; 307/542; 307/555; 307/562; 358/172
[58] Field of Search ............... 307/540, 542, 546, 553, 307/555, 562, 350, 234; 358/171, 172, 178

[56] References Cited

U.S. PATENT DOCUMENTS

| | | | |
|---|---|---|---|
| 3,549,801 | 12/1970 | Davis | 358/172 |
| 3,560,648 | 2/1971 | Kitsopoulos | 358/178 |
| 4,415,929 | 11/1983 | Yoshisato | 358/172 |

FOREIGN PATENT DOCUMENTS 902475  8/1962  United Kingdom ................ 358/172

Primary Examiner—John Zazworsky
Attorney, Agent, or Firm—John Smith-Hill

[57] ABSTRACT

A circuit for providing a signal which is clamped to a desired DC voltage level comprises an amplifier for receiving an input signal and a feedback loop for developing an offset signal for combination with the input signal by the amplifier to provide an output signal at the desired DC voltage level. The feedback loop includes a noise detector for detecting the level of noise present in the output signal, and adjusting the time constant of the feedback loop in dependence thereon.

7 Claims, 3 Drawing Figures

CLAMP CIRCUITS

This invention relates to clamp circuits and more particulary, but not excusively, to feedback video clamp circuits.

It is known to use clamp circuits in the field of video signal processing. The clamp circuit (otherwise known as a DC restorer) is employed to clamp the composite video signal to the correct DC level for further processing by other circuitry and to remove low-frequency noise, including mains hum at 50 Hz or 60 Hz, from the video signal. A video clamp circuit operates by identifying a portion of the video waveform which recurs and ideally is of constant voltage, or is a known AC component superimposed on a constant voltage, for example the back porch of the horizontal synchronizing interval or the horizontal sync tip, and clamps this selected portion of the video waveform to a predetermined voltage potential level.

Video clamp circuits may be classified by the speed of the clamping action. The speed may be fast, so as to clamp in several TV lines, or it may be slow and take many TV frames in order to clamp. A clamp circuit is designed to operate with a particular speed in order to optimize a certrain function, such as removing mains hum.

It has been found that a conventional video clamp circuit will not satisfactorily remove all commonly encountered low frequency distortions. Slow clamps are not able to adequately remove mains hum. Fast clamps can do an adequate job of removing mains hum, and even more abrupt changes in DC level such as might be encountered when switching between two different signal sources, but may cause other problems when there is noise on the incoming signal. One such problem is a phenomenon known as "streaking", which is so named because when the affected signal is viewed on a picture monitor bright and dark streaks will be seen. This "streaking" is much more objectionable than the inadequately removed mains hum which arises through use of a slow clamp. Note that by noise persons skilled in the art generally mean random impulsive and continuous signals with frequency content predominatly above 15 kHz and which would be translated to lower frequency noise (i.e. streaking) by the action of a conventional fast clamp.

According to the present invention there is provided a circuit for providing a signal which is clamped to a desired DC voltage level, comprising amplifier means for receiving an input signal, means for developing an offset signal for combination with the input signal by the amplifier means to provide an output signal at the disired DC voltage level, the signal developing means having a variable time constant and operating, in use, to bring the output signal to the desired DC voltage level in an interval dependent upon the value of said time constant, and means for detecting the level of noise present in the output signal and adjusting the value of said time constant in dependence thereon.

The present invention may be used to provide a video clamp circuit which adapts automatically to variation in the noise level of the incoming video signal. As the noise level of the incoming signal increases, the speed at which the signal is clamped is reduced. This ability of the clamp circuit to adapt its clamp speed to the noise level enables the clamp circuit to provide good DC level restoration without introducing other problems.

Figure 2:
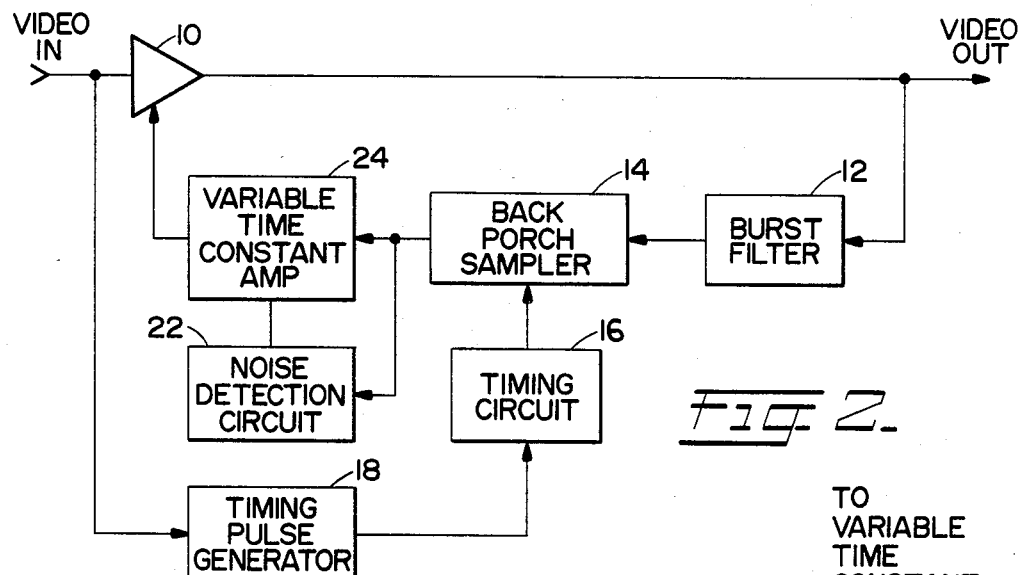
Figure 3:
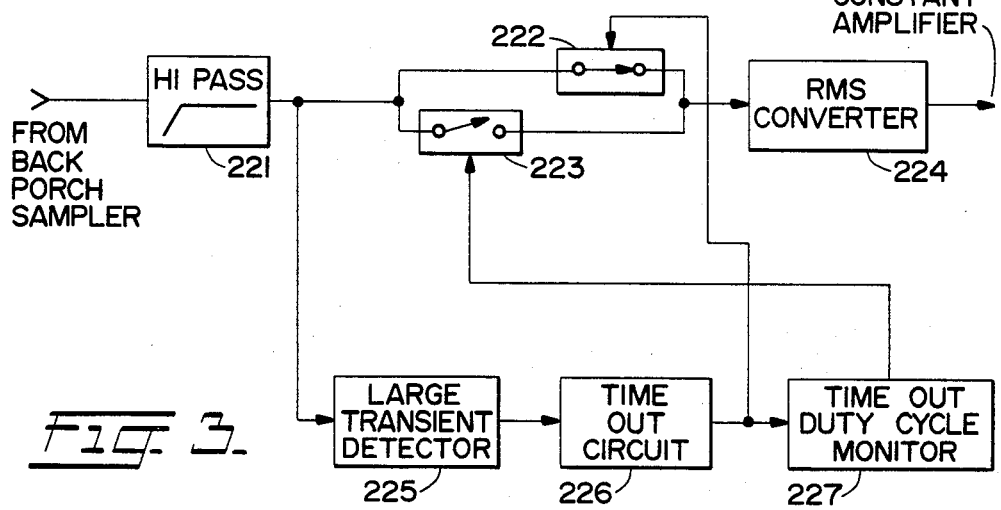

For a better understanding of the invention, and to show how the same may be carried into affect, reference will now be made, by way of example, to the accompanying drawings in which, FIG. 1 illustrates diagrammatically a section of a composite video signal;

FIG. 2 is a block diagram of a video clamp circuit embodying the present invention; and FIG. 3 is a block diagram of the noise detection circuit of FIG. 2.

FIG. 1 illustrates the section of a composite vidio signal that is between successive horizontal lines of the raster. At the end of one line (the right side of the television screen when viewed from the front) the video signal drops to the blanking level and remains briefly at the blanking level before the horizontal sync pulse occurs (the so-called front porch of the synchronizing interval). The sync pulse is a negative-going pulse, and the base portion of the pulse is known as the sync tip. After the sync pulse, the signal returns to the blanking level for the back porch of the synchronizing interval. A subcarrier reference color burst occurs during the back porch of the synchronizing interval. After the back porch, the next horizontal line of the video signal commences.

The circuit illustrated in FIG. 2 comprises an input amplifier 10 which receives the composite video input signal. The output of the amplifier 10 is used to generate a noise-sensitive DC signal which is fed back to the amplifier 10 as a DC offset signal. The feedback loop by which the DC offset signal is generated functions by sampling the output of the amplifier 10 during the burst time on the back porch of the video signal. The sampling is accomplished by means of a burst filter 12 and a back porch sampler 14. The burst filter 12 is a combination band reject, low pass filter tuned to the frequency of the color burst signal. The output of the burst filter is fed to the back porch sampler, which performs an averaged sample and hold function during burst time. The back porch sampler operates under control of a timing circuit 16 which receives horizontal sync pulses from a time-pulse generator 18. The output of the back porch sampler 14 is representative of the average DC level of the output signal during burst time, and is applied to a variable time constant amplifier 24 and to a noise detection circuit 22. The output of the amplifier 24 is applied to the amplifier 10 as a DC offset voltage, which brings the DC level of the output video signal to the desired level.

Referring to FIG. 3, the signal received by the noise detection circuit 22 from the back porch sampler is first processed by a high pass filter 221 in order to remove the DC and low frequency information which are present at the output of the back porch sampler and are systematic effects which should not be detected as noise. The ouput of the high pass filter 221 is fed to two analog switches 222 and 223 which are in parallel and determine whether the output of the high pass filter is passed to the RMS converter 224. The high pass filter output also is used by the large transient detector 225, which controls the time out circuit 226. The output of the time out circuit 226 controls the analog switch 222 and is fed to the time out duty cycle monitor 227. Finally the time out duty cycle monitor 227 is used to control the analog switch 223.

In normal operation, that is to say when the incoming signal is received without large amounts of noise or large DC level transients, the output of the burst sampler contains HF information which is almost solely the result of noise present on the incoming signal. Under this condition the output of the high pass filter is allowed to pass through the switch 222 into the RMS converter 224 which produces a DC output proportional to the RMS value of its input and hence to the noise on the incoming signal.

In the case of an input signal which contains large amounts of noise or large DC level transients, the large transient detector 225, time out circuit 226, and time out duty cycle monitor 227 come into use. If a large DC level shift occurs such as might be encountered when switching between different signals, the clamp will react to correct this level shift and in doing so cause a large high frequency transient to appear at the output of the high pass filter 221. The transient should not be detected as noise, since it is just the clamp acting to correct a systematic error. Therefore the large transient detector 225 determines whether the amplitude of the transient exceeds an amount which would cause unacceptable errors in the output of the RMS converter and causes the switch 222 to open and prevent the large transient from reaching the RMS converter if its amplitude is excessive. The large transient detector does this by triggering the time out circuit 226 which causes the switch 222 to open for a short fixed time period. This time period is long enough to prevent the bulk of the recovery transient from reaching the RMS converter.

Unfortunately DC level transients cannot be distinguished from large amounts of noise solely on the basis of amplitude information. The time out duty cycle monitor distinguishes between DC level transients and large amounts of noise at an additional level of discrimination by using the assumption that DC level transients are unlikely to occur on a very frequent basis. The time out duty cycle monitor does this by determining the duty cycle of time out circuit 226, i.e., the aggregate time for which the circuit 226 has held the switch 222 open within a predetermined period, e.g. a few TV lines. If the duty cycle exceeds a limit which is established in advance and may be, for example, 25%, the duty cycle monitor 227 detects this and overrides the switch 222 by causing the switch 223 to close and allow the output of the high pass filter 221 to reach the RMS detector 224, since based on the assumption of infrequent DC level transients the large transient detector is responding to noise and not to large transients. In this way a satisfactory determination of noise is achieved even in the presence of large DC transients.

As noted above, the noise detector 22 generates a voltage which is proportional to the amplitude of the noise present on the output of the burst sampler. The output signal from the noise detector 22 is applied as a control voltage to the variable time constant amplifier 24. The time constant of the amplifier 24, and hence the speed of the feedback loop formed by the filter 12, sampler 14 and amplifier 24, is electrically controlled by the output signal from the noise detector, so that a video signal which is relatively free of noise is clamped rapidly, and noisier video signals are clamped progressively more slowly. In this manner the consequences of sampling the back porch of the output video signal during an interval when its level is determined by noise, rather than systematic effects, and thus providing an input to the amplifier 24 which reflects the noise level rather than the level of systematic effects, are minimized: by causing the signal to be clamped slowly, the feedback loop effectively integrates the sampled level of the back porch over an extended period and thus minimizes the effect of noise.

It will be appreciated that the invention is not limited to the particular clamp circuit which has been shown and described, since variations may be made therein without departing from the scope of the invention as defined in the appended claims. For example, instead of sampling the output signal from the amplifier 10 during the burst time on the back porch of the horizontal synchronizing interval in order to determine the DC level of the signal and to generate the DC offset voltage, the signal may be sampled during sync tip to generate the DC offset voltage. In addition, the invention is not limited to the general class of DC restorers using feedback. For example, the invention can also be implemented as a feedforward DC restorer. Although the invention has been described in connection with a conventional analog color video signal, the principles of the invention are also applicable to digital video signals (using either hardware or a software algorithm), to inverted video signals and to monochrome video signals.

I claim:

1. A circuit for providing a signal which is clamped to a desired DC voltage level, comprising:
    amplifier means for receiving an input signal;
    means for developing an offset signal for combination with the input signal by the amplifier means to provide an output signal at the desired DC voltage level, the signal developing means having a variable time constant and operating, in use, to bring the output signal to the desired DC voltage level in an interval dependent upon the value of said time constant;
    a noise detector which is operative, in use, to generate a first control signal representative of the deviation between the actual average absolute value of the output signal voltage during a predetermined interval and a predetermined nominal average absolute value of the output signal voltage during said interval, the signal developing means being responsive to the first control signal to adjust the time constant of the signal developing means;
    means for providing a second control signal if the actual DC voltage level of the output signal during said interval exceeds a predetermined threshold value; and
    means for responding to said second control signal by inhibiting application of the first control signal to the signal developing means.

2. A circuit according to claim 1, wherein said signal developing means comprise means for identifying a portion of the output signal having a nominally constant DC voltage level and for providing a signal which is dependent upon the actual DC voltage level of said portion of the output signal and which constitutes said offset signal.

3. A circuit according to claim 2, wherein said predetermined interval over which the actual absolute value of the output signal voltage is averaged in order to generate the first control signal corresponds to said portion of the output signal.

4. A circuit according to claim 1, wherein the noise detector has an input terminal to which a signal corresponding to said output signal is applied during said predetermined interval, a converter having an output terminal at which said first control signal is developed, and switch means interposed between said input terminal and said converter and responsive to said second control signal to prevent the signal applied to the input terminal from reaching said converter.

5. A circuit according to claim 4, wherein the output signal has a nominally constant DC voltage level during said predetermined interval, and said converter is a root mean square converter.

6. A circuit according to claim 4, wherein the switch means comprise a first switch and a second switch connected in parallel between said input terminal and said converter, the first switch being normally open and the second switch being normally closed and being responsive to the second control signal to open for a predetermined interval, and said switch means also comprising an override circuit for detecting whether the frequency with which the second control signal is generated exceeds a predetermined limit and closing said first switch if said frequency exceeds said limit.

7. A circuit according to claim 1, wherein said signal developing means comprise means for identifying a portion of the output signal having a nominally constant DC voltage level and for providing a signal which is dependent upon the actual DC voltage level of said portion of the output signal and which constitutes said offset signal, and the first control signal represents the deviation between the actual average absolute value of the voltage level of said portion of the output signal said nominally constant DC voltage level.

* * * * *